(12) United States Patent
Kalliomäki

(10) Patent No.: US 11,542,176 B2
(45) Date of Patent: Jan. 3, 2023

(54) METHOD AND SYSTEM FOR TREATMENT OF AN UNDERWATER SURFACE AND MATERIAL REMOVED FROM IT

(71) Applicant: DG-DIVING GROUP LTD., Turku (FI)

(72) Inventor: Mauri Kalliomäki, Turku (FI)

(73) Assignee: DG-DIVING GROUP LTD., Turku (FI)

( * ) Notice: Subject to any disclaimer, the term of this patent is extended or adjusted under 35 U.S.C. 154(b) by 59 days.

(21) Appl. No.: 16/634,518

(22) PCT Filed: Jul. 11, 2018

(86) PCT No.: PCT/FI2018/050541
§ 371 (c)(1),
(2) Date: Jan. 27, 2020

(87) PCT Pub. No.: WO2019/012184
PCT Pub. Date: Jan. 17, 2019

(65) Prior Publication Data
US 2021/0114896 A1 Apr. 22, 2021

(30) Foreign Application Priority Data
Jul. 13, 2017 (FI) ...................................... 20175684

(51) Int. Cl.
*C02F 1/00* (2006.01)
*A46B 13/02* (2006.01)
(Continued)

(52) U.S. Cl.
CPC .............. *C02F 1/004* (2013.01); *A46B 13/02* (2013.01); *B63B 59/08* (2013.01); *C02F 1/32* (2013.01);
(Continued)

(58) Field of Classification Search
None
See application file for complete search history.

(56) References Cited

U.S. PATENT DOCUMENTS 7,905,192 B1 3/2011 Hertel, III
9,505,472 B2 11/2016 Kalliomäki
(Continued)

FOREIGN PATENT DOCUMENTS

FR 2534548 A1 4/1984
GB 2131288 A 6/1984
(Continued)

OTHER PUBLICATIONS

Search Report for related Finland Application No. 20175684; report dated Jan. 25, 2018.
(Continued)

*Primary Examiner* — Richard C Gurtowski
(74) *Attorney, Agent, or Firm* — von Briesen & Roper, s.c.

(57) ABSTRACT

The invention relates to a method and a system for treatment of an underwater surface (S) and material removed from it at a cleaning site. The underwater surface is cleaned by a brush device (1), by which effluent containing solid matter removed from the underwater surface in connection with cleaning is conveyed to a treatment unit (5) where the effluent is subjected to separation and filtering. In a first step, the solid matter contained in the effluent is separated from the effluent in a form as unbroken as possible, immediately followed by a second step in which the effluent is precipitated. Said second step is immediately followed by a third step in which the effluent is filtered. The filtered effluent is discharged directly back to a body of water or to another
(Continued)

clean water connection at the cleaning site. The effluent may be subjected to additional filtering and/or disinfection, if necessary.

22 Claims, 4 Drawing Sheets

(51) Int. Cl.
   *B63B 59/08* (2006.01)
   *C02F 1/32* (2006.01)
   *C02F 1/52* (2006.01)
   *C02F 103/00* (2006.01)
   *C02F 103/08* (2006.01)

(52) U.S. Cl.
   CPC .......... *C02F 1/52* (2013.01); *C02F 2103/008* (2013.01); *C02F 2103/08* (2013.01); *C02F 2201/008* (2013.01); *C02F 2303/04* (2013.01); *C02F 2303/24* (2013.01)

(56) References Cited

U.S. PATENT DOCUMENTS

| | | |
|---|---|---|
| 2004/0194237 A1 | 10/2004 | Walton |
| 2005/0098496 A1 | 5/2005 | Hamann et al. |
| 2005/0139530 A1* | 6/2005 | Heiss .................. C02F 9/00 |
| | | 210/85 |
| 2012/0006244 A1 | 1/2012 | Van Rompay |
| 2014/0237740 A1 | 8/2014 | Kauffman |

FOREIGN PATENT DOCUMENTS

| | | |
|---|---|---|
| JP | S54102779 A | 8/1979 |
| WO | 03059732 A1 | 7/2003 |
| WO | 2006104759 A1 | 10/2006 |
| WO | 2011015786 A1 | 2/2011 |
| WO | 2015031933 A1 | 3/2015 |

OTHER PUBLICATIONS

Search Report for related International Application No. PCT/FI2018/050541; report dated Oct. 11, 2018.

* cited by examiner

METHOD AND SYSTEM FOR TREATMENT OF AN UNDERWATER SURFACE AND MATERIAL REMOVED FROM IT

FIELD OF THE INVENTION

The invention relates to a method for treatment of an underwater surface and material removed from it at a site of cleaning, in which method the underwater surface is cleaned with a brush device, and effluent, containing solid matter removed from the underwater surface by the brush device in connection with the cleaning, is conveyed to a treatment unit which is provided with a separating device and a filtering device, wherein in a first step the solid matter contained in the effluent is separated from the effluent according to the preamble of claim 1. The invention also relates to a system for treatment of an underwater surface and material removed from it, as well as a protective housing, a trailer, a vehicle, and a water vehicle, comprising the system.

PRIOR ART

The treatment of underwater surfaces with various types of brush devices is wellknown. Such an underwater surface may be, for example, the underwater hull of a vessel, the side or the bottom of a vessel, from which fouling, marine biota, and other debris should be removed. Such harmful material causes a lot of friction when the vessel moves in water, which also increases the fuel consumption of the vessel to a considerable extent. If such fouling and marine biota are not carefully removed, this may also result in undesired spread of non-native species.

Such underwater surfaces also commonly bear coatings or paints, such as antifouling and toxic paints, which come off when the surfaces are cleaned, and cause chemical contamination of waters where the underwater surface is cleaned.

Brush devices are presented, for example, in documents FR 2 534 548, WO 2011/015786, GB 2 131 288, US 2012/0006244, US 2004/0194237, and U.S. Pat. No. 9,505,472.

Increasingly strict environmental regulations impose specific restrictions on the treatment of underwater surfaces.

Proposals have also been made to conduct the cleaning of underwater surfaces in such a way that mitigates the release of removed material into surrounding waters. According to U.S. Pat. No. 7,905,192, effluent that contains material removed by a brush device is collected and conveyed to a separate treatment unit in which the effluent is purified so that it can be collected in a collecting tank or transferred to a sewer system. Similar solutions are presented in publications US 2014/0237740 and WO 2015/031933. The apparatuses and methods of prior art are very complex, applying multi-step mechanical and chemical treatments for purifying the waste water. In practice this also means that the prior art apparatuses are large in size and heavily dependent on a supply of external energy.

SUMMARY OF THE INVENTION

An object of the invention is to eliminate the problems of prior art and to provide a simple procedure which is efficient in view of the environment and by which the effluent collected in connection with the cleaning of the underwater surface can be returned to a body of water at the site of cleaning after it has been processed. This object is achieved by the method according to claim 1 and the system according to claim 10.

The basic idea of the invention is to provide a method by which solid matter is separated from the effluent in such a way that the remaining effluent can be easily brought to a state which will not contaminate the body of water at the site of cleaning when the effluent is returned to the body of water. It is thus a waste water treatment process. This is realized by a method in which in the first step the solid matter contained in the effluent is separated from the effluent in a form as unbroken as possible by screening by means of a screening device, after which, in a second step immediately following said first step, the effluent is precipitated, and after which in a subsequent third step immediately following said second step, the effluent is filtered, and in which method the filtered effluent is discharged directly back to the a body of water, i.e. the surrounding waters, or another clean water connection at the site of cleaning. In this way, there is no need to store the effluent separately and to transfer it for example to a waste water treatment plant.

This sequence of three steps successively following immediately one after the other, have been found crucial for the treatment of the effluent containing solid matter so that it can be discharged directly back to the body of water at the cleaning site, or alternatively to another clean water connection by rendering the effluent in a sufficient cleaned state for this purpose.

The treatment of the surface refers to, for example, both the cleaning and a polishing of the surface, according to the surface in question and the purpose of its treatment.

In said first step the solid matter contained in the effluent is separated from the effluent so that the solid matter remains in a form that is as unbroken as possible, by using a screen structure of the treatment unit. Consequently, the solid matter containing a lot of fouling and marine biota attached to the underwater surface, is kept as unbroken as possible in said first step, whereby in particular a minimum amount of nitrogen and phosphorus, and possibly other unwanted substances or impurities, is dissolved and entrained in the effluent separated from the solid matter. The separation performed in the first step is coarse separation, whereby the permeability of the screen structure is preferably in the order of 70 to 100 microns.

In connection with said first step, the solid matter separated from the effluent in connection with the screening is preferably conveyed to a separate collecting vessel, enabling the collection of the solid matter in a compact form for possible after-treatment or removal.

The effluent separated in connection with the screening is preferably conveyed via a flow section comprised by the treatment unit to a filtering device.

In said second step, the flow section is preferably supplied with a precipitating agent for precipitating the effluent before conveying it to the filtering device. As a precipitating agent, commonly available commercial precipitating agents may be used. Examples of precipitating agents include liquid polyaluminium chloride or granulated products of slaked lime.

The filtering device is preferably equipped with filters for filtering the effluent in said third step before the effluent is conveyed directly back to the body of water or another water connection at the site of cleaning. The permeability of the filters is in the range of 5 to 40 microns, preferably in the range of 5 to 15 microns.

The effluent is advantageously subjected to additional filtering before it is discharged directly back to the body of water or another water connection. In this way, it is possible to secure that the effluent can be returned directly to the body of water, for example if the collected effluent is of poorer quality than normal. The permeability of the additional filters is thus selected as appropriate.

As filters and additional filters, appropriate commercially available filters are used.

Furthermore, the effluent is advantageously disinfected after being filtered in said third step or after being subjected to additional filtering. In this way, further assurance is gained that the effluent can be returned directly to the body of water or to another clean water connection, for example if the effluent has contained biota, microorganisms, such as bacteria, viruses, protozoa, etc. The disinfection is preferably performed by a UV disinfection device. A UV sensor comprised by the UV disinfection device also enables quality control of the effluent treatment process.

Preferably, the brush device is hydraulically driven by a compressor, to facilitate its use under marine conditions.

As particularly the fouling and marine biota are in the form of solid matter as unbroken as possible when separated from the effluent, the nitrogen and phosphorus contents of the effluent will remain low, whereby the nitrogen and phosphorus contents of the effluent can be restored to almost the normal levels in a body of water.

Precipitated and filtered in this way, the effluent can be discharged directly to the body of water at the site of cleaning.

The above mentioned solid matter includes fouling, marine biota, etc., and possibly paint, rust, or other impurities removed from the underwater surface.

The features of the system according to the invention are given in claims 10 to 18. In practice, the system comprises a brush device and a compressor, a first pump device, and a compact treatment unit with a basin-type element, an underlying flow section, and a filtering device, possible yet another pump device and an additional filtering device, a disinfection device, if necessary, and a discharge pipe or a discharge fitting into a body of water. This allows for a compact and light-weight system which can be conveniently placed in, for example, a protective housing, a trailer, a vehicle, or a water vehicle. This makes it possible to readily transport the system from one place to another.

The protective housing, trailer, vehicle, and water vehicle comprising the system will be defined in the claims 19 to 22.

BRIEF DESCRIPTION OF THE DRAWINGS

In the following, the invention will be described by way of example only with reference to the attached schematic drawings, in which.

DETAILED DESCRIPTION

Figure 1:
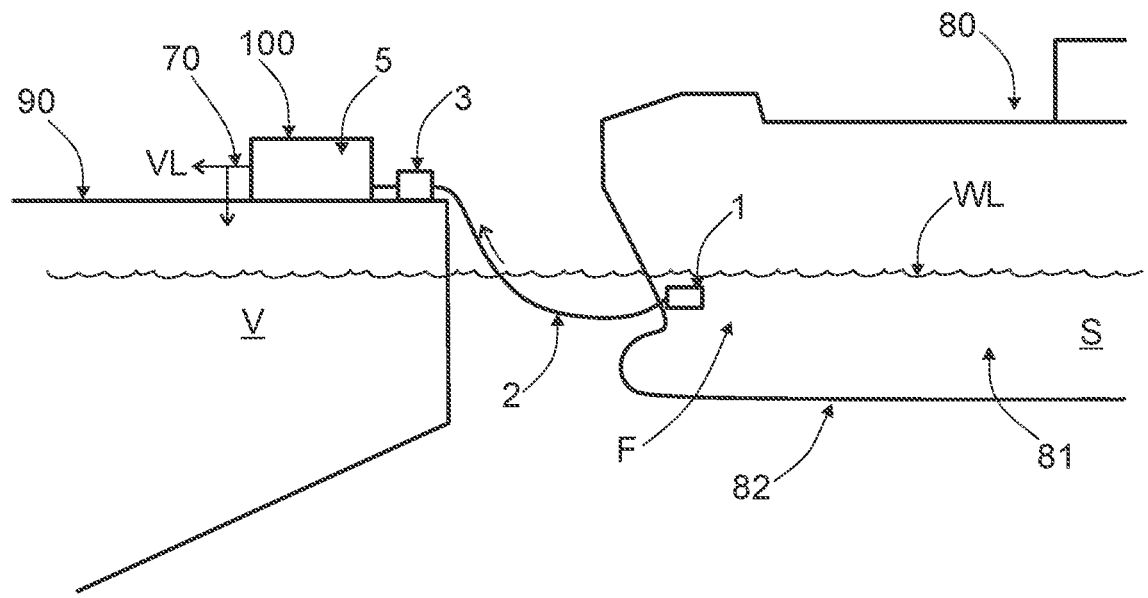
FIG. 1 illustrates an embodiment of the invention.

FIG. 1 illustrates an embodiment of the method and the system according to the invention. The reference 80 indicates a vessel whose underwater surface S, for example a side 81 or the bottom 82, is cleaned. The water line of the vessel 80 is indicated by reference WL. For cleaning the underwater surface, a brush device 1 is deployed, which is moved forward along the side 81 of the vessel 80 to clean the underwater surface S from material attached to it, such as fouling, marine biota, or other impurities F. The material removed from the surface S is conveyed from the brush device 1 via a discharge pipe 2 to a treatment unit 5 placed on a quay 90, where effluent which contains solid matter removed from the underwater surface is treated so that the effluent can be discharged directly back to a body of water V or another clean water connection VL (indicated with arrow lines), via a discharge pipe 70 or a discharge fitting. A first pump device 3 is used for conveying effluent from the brush device 1 via the discharge pipe 2 to the treatment unit 5 (effluent flow direction indicated with arrow lines). The system is preferably provided with a protective housing 100.

The brush device 1 according to the invention may also be used for treating, for example, the rudder of the vessel 80, for example for cleaning or polishing it. The above discussed problems of prior art and the disadvantages of fouling of surfaces apply to them as well. The size of the apparatus may be adapted to the object to be treated, the purpose of the treatment, as well as the type and the shape of the surface.

The following is a brief description of how an exemplary brush device is used for the actual cleaning of an underwater surface, with the example of the side and the bottom of a vessel.

The starting point is, for example, that fouling, marine biota or other impurities F have adhered to the side 81 and the bottom 82 of the vessel 80, which impedes the operation of the vessel. For cleaning the vessel, the brush device 1 is introduced in the water, for example guided by a diver, and is placed against the underwater surface S of the vessel 80 to be treated.

Figure 4:
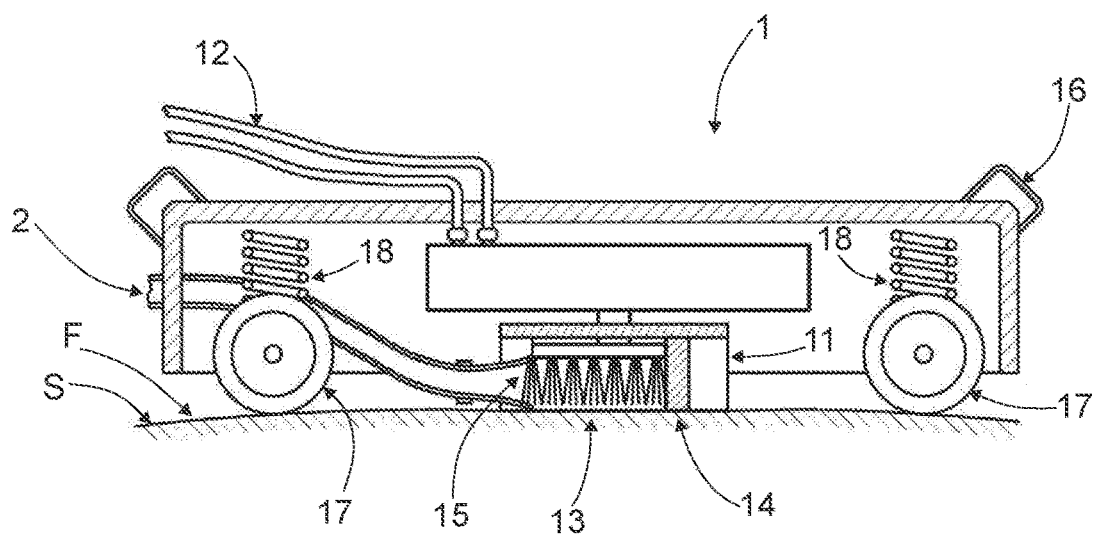
FIG. 4 shows an example of a brush device comprised by the system.

As a brush device 1, a brush device according to FIG. 4 is preferably used, which comprises brush means 13 enclosed in a housing 11 and which is equipped with a hydraulic drive 12 powered by a compressor for rotating the brush means 13 of the brush device. The hydraulic drive 12 is turned on. The brush means 13 equipped with bristles are set to rotate so that the underwater surface S is cleaned. The rotation of the brush means 13 on the underwater surface S to be treated, within a skirt 14 provided in the housing 11 enclosing the brush means 13, produces a vacuum inside the housing 11, whereby the device 1 is attached by vacuum to the underwater surface S.

At the same time, the fouling or marine biota F within the area of the underwater surface enclosed by the housing 11 is brushed off the surface S. The removed material entrained in the water contained in the housing 11 is conveyed by the brush device 1 via a discharge opening 15 provided in the housing 11 to a discharge pipe 2. The skirt 14 of the housing 11 tightly encloses the rotating brush means 13, whereby the removed material cannot spread in the housing 11 or escape from it into the body of water V. Furthermore, guides placed at the mouth of the discharge opening 15 may be used to ensure that the removed material is guided directly into the discharge opening 15, from which it can be conveyed further via the discharge pipe 2 to the treatment unit 5, as described above.

A diver can readily steer the device further along the underwater surface S by applying handles 16 provided on the device 1. To facilitate the movement of the device, it is equipped with wheels 17 whose travel may be balanced by, for example, suspension 18.

In this way, all the removed material and the water flowing into the housing 11 can be conveyed to the discharge opening 15 and further via the discharge pipe 2 to the treatment unit 5. This is to secure the underwater cleaning operation by a simple and easy-to-use brush device 1 without contaminating the surrounding waters.

The above described brush device is only given as an example. In the system and the method according to the invention, it is also possible to use different types of brush devices suitable for the same use.

The treatment unit 5, which will be described in more detail with reference to FIG. 5 and FIG. 6 in the following, may be placed, as shown in the example of FIG. 1, on a quay 90, from where the operation of the brush device 1 may also be controlled.

The system comprises a first pump device 3 connected to the discharge pipe 2, for pumping effluent that contains solids to the treatment unit 5.

Figure 2:
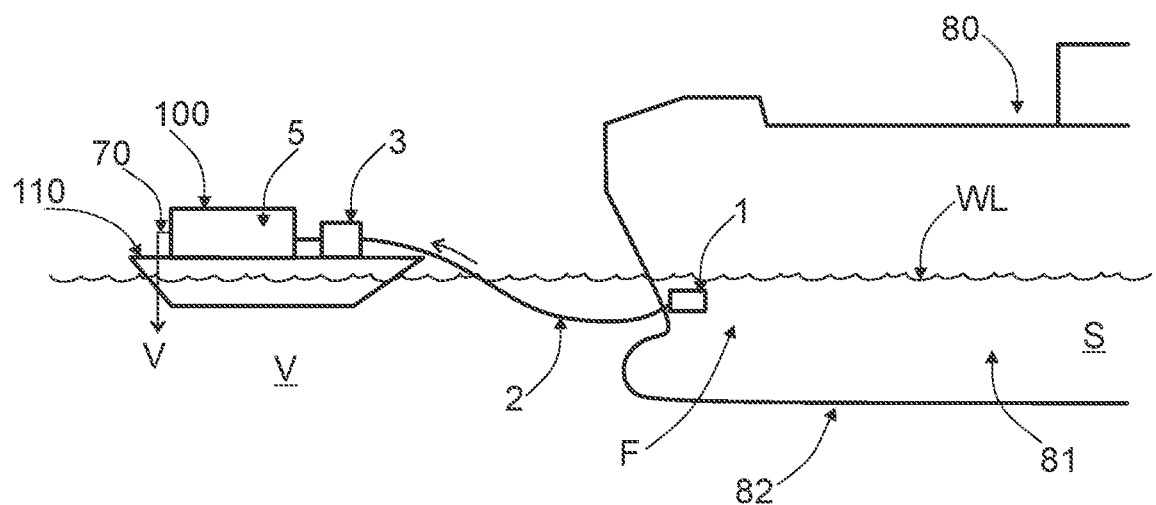
FIG. 2 illustrates another embodiment of the invention.

Furthermore, as shown in FIG. 2, the whole system may be placed in, for example, a water vehicle 110, such as a boat or a barge, in which case the operation of cleaning a ship may also be performed further offshore and not only adjacent a quay. The system is preferably equipped with a protective housing 100.

Figure 3:
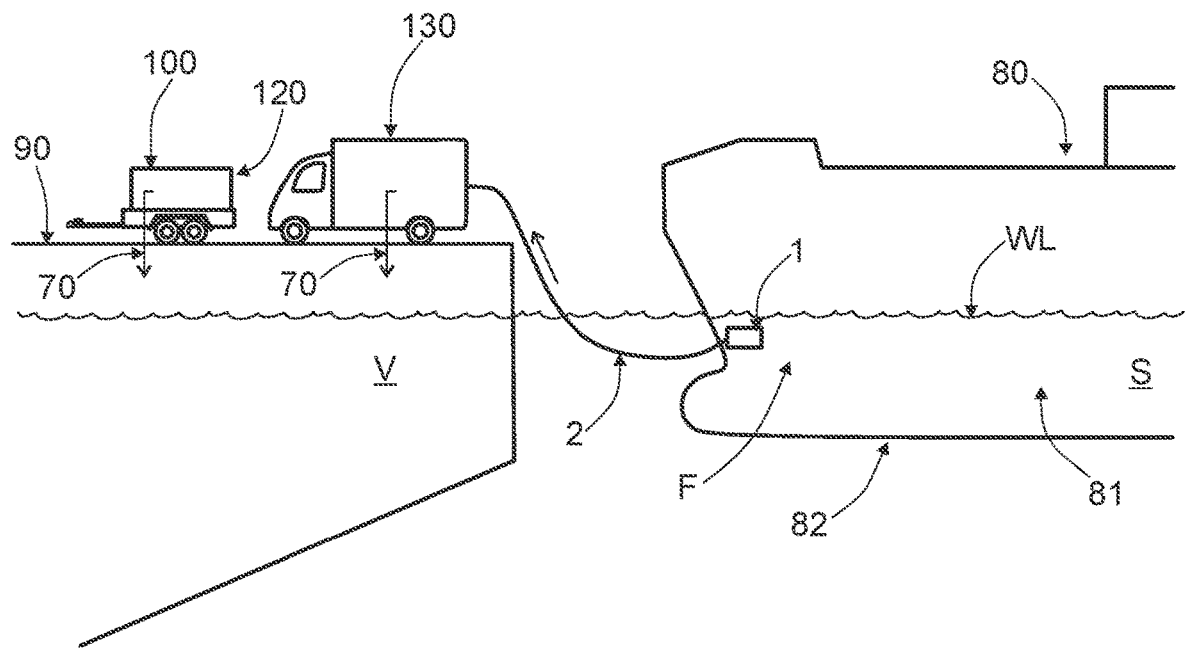
FIG. 3 illustrates an alternative embodiment of the invention.

Alternatively, as shown in FIG. 3, the whole system may be arranged in, for example, a protective housing 100 which is preferably carried by a trailer 120 or a vehicle 130, or directly in a vehicle 130, such as a van. In this way, it is possible to readily implement a compact and easily transferrable unit which makes it possible to move the system from one cleaning site to another as needed, for example by a van or a trailer towed by an automobile. This is particularly advantageous, because it makes it possible to transport the system easily to each specific object to be cleaned.

In this way, there is no need for the complex prior art systems arranged in connection with specific cleaning sites, large and dependent on locally available energy.

FIGS. 1 and 2 show the first pump device 3 and the brush device 1 with the discharge pipe 2 arranged outside the protective housing 100. In a corresponding way, FIG. 3 shows the brush device 1 and the discharge pipe 2 arranged outside the protective housing 100. Due to the transportability of the system, the protective housing or the transporting means are naturally arranged so that all the components of the system can be transported together.

Figure 5:
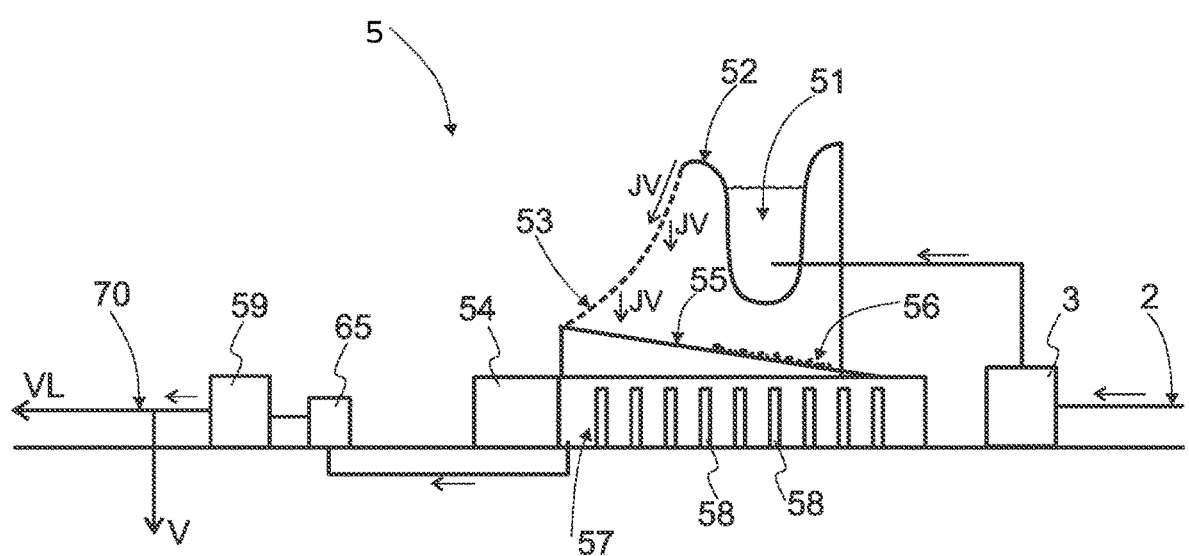
FIG. 5 shows an embodiment of a treatment unit comprised by the system.
Figure 6:
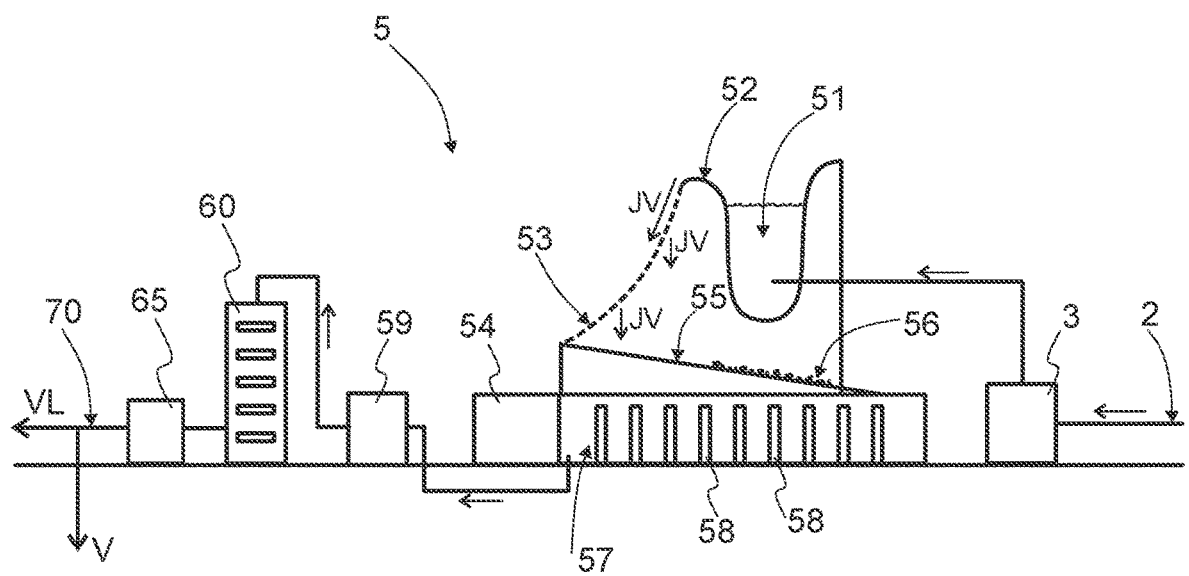
FIG. 6 shows another embodiment of a treatment unit comprised by the system.

The treatment unit 5 included in the system and shown in FIG. 5 and FIG. 6 comprises a separating device with a basin-type element 51, into which the effluent is conveyed from the brush device 1 via the discharge pipe 2 by means of the first pump device 3 (effluent flow direction indicated with arrow lines). The effluent is collected into the basin-type element 51 operating by an overflow principle so that the effluent flows over one edge 52 of the basin-type element 51 onto a screen structure 53 which is preferably in the form of a curved screen. When the effluent JV flows along and through the screen structure 53 in the first step of the method according to the invention, solid matter is separated from the effluent and left on the screen structure 53, from which the solid matter is collected into a collecting vessel 54. The permeability of the screen structure 53 is preferably in the range of 70 to 100 microns. The separation performed in the first step of the method according to the invention is coarse separation.

The effluent JV flowing through the screen structure 53 flows onto a flow section 55 under the screen structure 53. A precipitating agent 56 is supplied to a flow surface of the flow section 55, for precipitating the effluent in a second step immediately following said first step according to the invention, before it flows to a first filtering device 57.

As the precipitating agent, commercially available precipitating agents may be used. Examples of precipitating agents include liquid polyaluminium chloride or granulated products of slaked lime.

In said second step of the method according to the invention, the effluent is conveyed through the precipitating agent 56 along the flow section 55 to the underlying filtering device 57 which may be in the form of e.g. a basin and which is equipped with filters 58.

The effluent precipitated in said second step of the method is filtered in a third step immediately following said second step of the method according to the invention, in the filtering device 57 equipped with filters 58. The permeability of the filters is in the range of 5 to 40 microns, preferably in the range of 5 to 15 microns. As filters, suitable commercially available filters can be used. In practice, the third step of the method thus follows directly after the second step of the method, as the effluent flows along the flow section 55 to the underlying filtering device 57.

The effluent, treated as shown in FIG. 5 and filtered in the third step of the method, is pumped by a second pump device 59 directly into the body of water. The effluent is pumped from the filtering device 57 directly to the body of water V or to a clean water connection VL at the site of cleaning, via a discharge pipe 70 or a discharge fitting. This will depend on the state to which the effluent has been brought; that is, in practice, on the permeability of the filters 58 used in the filtering device 57 in the third step of the method.

As shown in FIG. 6, the effluent is advantageously subjected to additional filtering after the filtering performed in the third step of the method, to make sure that even a more contaminated effluent can be brought to a state in which it can be returned directly to the body of water. In this case, the effluent filtered in the filtering device 57 is pumped by the second pump device 59 to an additional filtering device 60, from which it can be conveyed, in a corresponding way, directly back to the water V at the cleaning site or another clean water connection VL, via a discharge pipe 70 or a discharge fitting. The permeability of the additional filters is thus selected as appropriate. The filters used are commercially available filters suitable for the use.

The solid matter includes fouling, marine biota, etc., and possibly for example paint, rust, or other impurities.

For eliminating non-native organisms, the effluent may be filtered with filters having a permeability in the above-mentioned preferable range of 5 to 15 microns.

For eliminating non-native organisms, the effluent may advantageously also be disinfected, if necessary, after the filtering performed in the third step of the method, or after a possible subsequent additional filtering.

The disinfection is preferably performed by a UV disinfection device.

If UV disinfection is applied, the UV disinfection device 65 is advantageously arranged either downstream of the filtering device 57, as shown in FIG. 5, or downstream of the additional filtering device 60, as shown in FIG. 6. In practice, the inclusion of the UV disinfection device does not increase the size of the treatment unit 5, whereby all the advantages of the present invention, mentioned above and below, would be achieved as well.

The UV disinfection device 65 preferably comprises a UV sensor, by which firstly a control of a sufficient disinfection efficiency is ensured. Consequently, the UV disinfection device may also be used for quality control of the system according to the invention, and of the process for treatment of the effluent in the treatment unit 5. The measurement result given by the UV sensor may be utilized for assessing the state of the treated effluent to make sure that the effluent is in an appropriate state to be discharged directly to a body of water or to another clean water connection.

The UV disinfection device is preferably in the form of a pipe. Examples of rated values include: UV permeability 40%/10 nm, UV dose 1500 J/m$^2$, and wavelength 254 nm.

Alternatively, disinfection may be performed by thermal treatment, by pasteurization, by reducing the oxygen content of the effluent and/or by supplying an inert gas to the effluent, by ozone treatment, or by using hydrogen peroxide.

According to the above, in the method according to the present invention, an underwater surface is first cleaned with a brush device, after which the effluent, containing solids removed from the underwater surface in connection with the cleaning, is conveyed to a treatment unit.

According to the invention, the effluent collected with the brush device is treated, as presented above, in a treatment unit, primarily in three steps.

In the first step, the solid matter contained in the effluent are separated, in a form that is as unbroken as possible, from the effluent by screening the solid matter from the effluent by means of a screening structure 53, preferably a curved screen. In this way, the solid matter can be collected separately into a collecting vessel 54. Because the solid matter, particularly fouling and marine biota, are kept in a form as unbroken as possible and isolated from the rest of the effluent, excessive contents of nitrogen or phosphorus, or other undesired substances, are not dissolved or formed in the effluent.

In the second step immediately following the first step, the effluent separated from the solids is precipitated by a precipitating device 55 supplied with precipitating agent 56, after which, in a third step immediately following the second step of the method, the effluent is filtered in a filtering device 57 equipped with filters 58.

As a result, effluent is obtained, having contents of, for example, nitrogen and phosphorus on levels that are acceptable with respect to environmental requirements. Consequently, the effluent may be returned directly to a body of water without causing damage to the environment. Thus, the effluent does not need to be transported separately to a treatment plant, for example. If necessary, the effluent may be subjected to additional filtering and/or disinfection.

The above described method steps allow for a system whose components can be assembled to form a compact structure of light weight. In practice, the system only comprises a brush device 1 and a compressor connected to it, a discharge pipe 2, a first pump device 3, and a compact treatment unit 5 having a basin-type element 51, an underlying flow section 55, and a filtering device 57, a second pump device 59, and possibly an additional filtering device 60 and/or a disinfection device 65, and a discharge pipe 70 or a discharge fitting leading to a body of water. i.e. the surrounding waters at the cleaning site.

This allows for a light-weight and compact system, which can be conveniently arranged in, for example, a protective housing 100, a trailer 120, a vehicle 130, or a water vehicle 110. This makes the system easily transportable from one place to another. The system can thus operate independently at the cleaning site.

In particular, the compact structure of the system, and the three successive method steps implemented by it, allow for effluent purification that meets environmental requirements and has a short pass-through or flow-through time.

The amount of solid matter separated from the effluent in the first step is relatively low, whereby its after-treatment and possible removal is easy.

The drawings and the related description are only intended to illustrate the basic idea of the invention. The details, such as the brush device, the pumps, the screen structure, the precipitation agent, the filtering device, the filtering apparatus, the filters, the disinfection device, the discharge pipes, etc., may vary within the scope of the ensuing claims.

The invention claimed is:

1. A method of cleaning an underwater surface of a structure, the method comprising:
    engaging a brush device with a cleaning site of the underwater surface of the structure to remove solid matter from the underwater surface of the structure;
    conveying effluent, which contains the solid matter removed from the underwater surface of the structure, from the cleaning site to a treatment unit located above water and remote from the cleaning site;
    separating a first portion of the solid matter from the effluent using a screen structure of the treatment unit;
    precipitating a second portion of the solid matter from the effluent;
    filtering a third portion of the solid matter from the effluent using a filter device to obtain filtered effluent; and
    discharging the filtered effluent directly back to a body of water or to another clean water connection at the cleaning site.

2. The method of claim 1, further comprising collecting the first portion of the solid matter in a separate collecting vessel.

3. The method of claim 1, in which the treatment unit includes a flow section, the method further comprising directing the effluent exiting the screen structure into the flow section of the treatment unit.

4. The method of claim 3, in which precipitating the second portion of the solid matter from the effluent comprises supplying the flow section with a precipitating agent.

5. The method of claim 1, wherein the filtering device comprises a plurality of filters.

6. The method of claim 1, further comprising, after filtering the third portion of the solid matter from the effluent, filtering a fourth portion of the solid matter from the effluent using an additional filtering device.

7. The method of claim 1, further comprising, after filtering the third portion of the solid matter from the effluent, disinfecting the effluent.

8. The method of claim 7, in which a UV disinfection device is used to disinfect the effluent.

9. The method of claim 1, wherein the brush device comprises a hydraulic drive powered by a compressor.

10. A system for cleaning an underwater surface of a structure, the system comprising:
    a brush device configured to engage a cleaning site of the underwater surface of the structure, thereby to remove solid matter from the underwater surface of the structure;
    a discharge pipe extending from the cleaning site to a treatment unit located above water and remote from the cleaning site; and
    a first pump device configured to convey effluent, which contains the solid matter removed from the underwater surface of the structure, via the discharge pipe from the cleaning site to the treatment unit;
    wherein the treatment unit comprises:

a separating device including a basin-type element, the basin-type element including a screen structure configured to separate a first portion of the solid matter from the effluent;
a precipitating device configured to precipitate a second portion of the solid matter from the effluent; and
a filtering device configured to filter a third portion of the solid matter from the effluent to obtain filtered effluent.

11. The system of claim 10, wherein the treatment unit further comprises a collecting vessel configured to receive the first portion of the solid matter separated in the separating device.

12. The system of claim 10, wherein the precipitating device comprises a flow section for conveying the effluent from the separating device.

13. The system of claim 10, further comprising a source of precipitating agent in communicating with the flow section.

14. The system of claim 10, wherein the filtering device comprises a plurality of filters.

15. The system of claim 10, further comprising an additional filtering device configured to receive the filtered effluent and to additionally filter a fourth portion of the solid matter from the effluent.

16. The system of claim 10, further comprising a disinfection device.

17. The system of claim 16, wherein the disinfection device comprises a UV disinfection device.

18. The system of claim 10, wherein the brush device comprises a hydraulic drive powered by a compressor.

19. The system according to claim 10, further comprising a protective housing configured to enclose the treatment unit.

20. The system according to claim 10, further comprising a trailer configured to support the treatment unit.

21. The system of claim 10, further comprising a vehicle configured to support the treatment unit.

22. The system of claim 10, further comprising a water vehicle configured to support the treatment unit.

* * * * *